No. 755,473. PATENTED MAR. 22, 1904.
F. H. ERB, Jr.
DOG COLLAR.
APPLICATION FILED JULY 20, 1903.
NO MODEL.
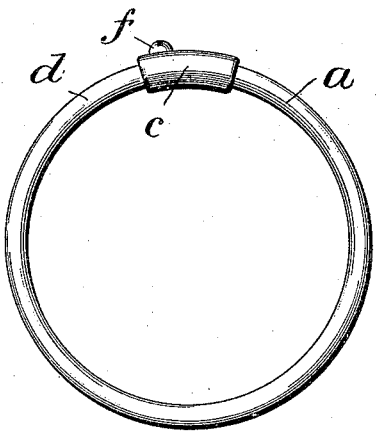
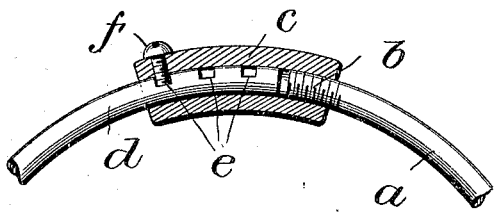
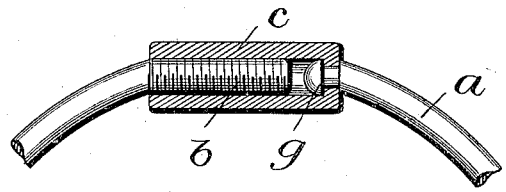

No. 755,473. Patented March 22, 1904.

UNITED STATES PATENT OFFICE.

FREDERICK H. ERB, JR., OF LAFAYETTE, INDIANA.

DOG-COLLAR.

SPECIFICATION forming part of Letters Patent No. 755,473, dated March 22, 1904.

Application filed July 20, 1903. Serial No. 166,385. (No model.)

*To all whom it may concern:*

Be it known that I, FREDERICK H. ERB, Jr., a citizen of the United States, residing at Lafayette, in the county of Tippecanoe and State of Indiana, have invented certain new and useful Improvements in Dog-Collars; and I do hereby declare the following to be a full, clear, and exact description of the invention, such as will enable others skilled in the art to which it appertains to make and use the same.

My invention relates to improvements in dog-collars; and the object of my invention is to produce a simple and cheap collar, one that can be readily put on or taken off from a dog's neck, and one that is adjustable for different sizes of dogs.

With these objects in view my invention consists of the construction and combinations of parts as hereinafter described and claimed.

In the accompanying drawings, Figure 1 is a side view of my improved dog-collar. Fig. 2 is a side view, partly in section, of a portion of the same on an enlarged scale; and Fig. 3 is a cross-section of a portion of a modified form of my invention.

The main part of the collar is composed of a spring-wire $a$, one end, $b$, of which is screw-threaded, and the other end, $d$, has a series of notches $e$ cut on one side thereof.

$c$ represents a ferrule or fastening device for holding the two ends of the wire $a$ together. This ferrule is curved in the arc of a circle and has a screw-threaded portion at one end through which the screw-threaded portion $b$ engages. The ferrule is bored out to receive the other end, $d$.

$f$ represents a set-screw passing through a hole in the ferrule $c$ and adapted to engage in any one of the notches $e$.

To put the collar on a dog's neck, the screw $f$ is loosened, pulled wholly or partially out of the ferrule $c$, and the collar slipped over the dog's neck. Then the portion $d$ is inserted into the ferrule $c$ and adjusted so that the set-screw $f$ is over one of the notches $e$, whereupon said screw is turned up, firmly fastening the two ends together.

In Fig. 3 a modified form is shown. In this case the screw-threaded portion $b$ of the wire $a$ is made straight and of some length. The ferrule $c$ is also made straight and is provided with an internal screw-thread. The ferrule $c$ is secured to the other end of the wire $a$ by a swivel-joint $g$, and putting the collar on the dog the ferrule $c$ is turned until the part $b$ is disengaged from said ferrule. The collar is then slipped over the dog's neck and the ferrule $c$ screwed over the portion $b$.

To a dog fancier the advantages of my improved collar are obvious. They are cheap, can be adjusted to fit dogs of different sizes, never collect any dirt, never cause skin diseases or rub the neck like a chain or leather collar. It tends to prevent dogs from fighting. The dog can never choke himself with this collar, as it cannot be twisted or wound around his neck like a chain collar.

Having thus described my invention, what I claim as new, and desire to secure by Letters Patent, is—

1. As an article of manufacture, a dog-collar comprising a spring-wire bent approximately into the form of a circle, and a device for securing together the ends of said wire, substantially as described.

2. As an article of manufacture, a dog-collar comprising a spring-wire bent approximately into the form of a circle, and a device for adjustably securing together the ends of said wire, substantially as described.

3. As an article of manufacture, a dog-collar comprising a spring-wire screw-threaded at one end and adapted to be bent approximately into the form of a circle, and a ferrule or fastening device to which the other end of said spring-wire is secured, substantially as described.

4. As an article of manufacture, a dog-collar comprising a spring-wire screw-threaded at one end and with a series of notches cut near the other end, said wire being adapted to be bent approximately into the form of a circle, a curved ferrule for uniting the ends of said wire, and a set-screw adapted to pass through said ferrule and into one of said notches, substantially as described.

In testimony whereof I affix my signature in presence of two witnesses.

FREDERICK H. ERB, JR.

Witnesses:
FRED. O. EVANS,
ADAM O. BEHM.